(12) United States Patent
Ishii et al.

(10) Patent No.: US 8,902,293 B2
(45) Date of Patent: Dec. 2, 2014

(54) IMAGING DEVICE

(75) Inventors: Yasunori Ishii, Osaka (JP); Masao Hiramoto, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 13/634,638

(22) PCT Filed: Oct. 19, 2011

(86) PCT No.: PCT/JP2011/005832
§ 371 (c)(1),
(2), (4) Date: Sep. 13, 2012

(87) PCT Pub. No.: WO2012/098599
PCT Pub. Date: Jul. 26, 2012

(65) Prior Publication Data
US 2013/0002825 A1    Jan. 3, 2013

(30) Foreign Application Priority Data

Jan. 17, 2011 (JP) ................................. 2011-007153

(51) Int. Cl.
*H04N 13/02* (2006.01)
*G03B 35/12* (2006.01)
*G03B 35/08* (2006.01)

(52) U.S. Cl.
CPC ............... *G03B 35/12* (2013.01); *G03B 35/08* (2013.01); *H04N 13/0214* (2013.01); *H04N 13/0217* (2013.01)
USPC .......................................................... 348/46

(58) Field of Classification Search
USPC .......................................................... 348/46
See application file for complete search history.

(56) References Cited

U.S. PATENT DOCUMENTS

| 6,807,295 | B1 | 10/2004 | Ono |
| 2002/0171740 | A1 | 11/2002 | Seo |
| 2008/0030597 | A1* | 2/2008 | Olsen et al. ................ 348/227.1 |
| 2009/0284627 | A1 | 11/2009 | Bando et al. |
| 2010/0066854 | A1 | 3/2010 | Mather et al. |
| 2012/0133743 | A1 | 5/2012 | Hiramoto et al. |

FOREIGN PATENT DOCUMENTS

| JP | 02-171737 A | 7/1990 |
| JP | 2001-016611 A | 1/2001 |
| JP | 2002-344999 A | 11/2002 |
| JP | 2003-134533 A | 5/2003 |
| JP | 2009-276294 A | 11/2009 |
| JP | 2010-038788 A | 2/2010 |
| JP | 2010-079298 A | 4/2010 |
| WO | 2011/151948 A1 | 12/2011 |

OTHER PUBLICATIONS

International Search Report for corresponding International Application No. PCT/JP2011/005832 mailed Dec. 27, 2011.

* cited by examiner

*Primary Examiner* — Sath V Perungavoor
*Assistant Examiner* — Jeffery Williams
(74) *Attorney, Agent, or Firm* — Renner, Otto, Boisselle & Sklar, LLP

(57) ABSTRACT

This 3D image capture device includes a light-transmitting section 2 with m transmitting areas (where m is an integer and m≥2) and a solid-state image sensor 1. The sensor 1 has unit elements, each of which includes n photosensitive cells (where n is an integer and n≥m) and n transmitting filters that face those photosensitive cells. If the wavelength is identified by $\lambda$, the transmittances of transmitting areas C1 and C2 are identified by $Tc1(\lambda)$ and $Tc2(\lambda)$, the transmittances of two transmitting filters are identified by $Td1(\lambda)$ and $Td2(\lambda)$, and the interval of integration is the entire visible radiation wavelength range, $\int Tc1(\lambda)Td1(\lambda)d\lambda>0$, $\int Tc1(\lambda)Td2(\lambda)d\lambda>0$, $\int Tc2(\lambda)Td1(\lambda)d\lambda>0$, $\int Tc2(\lambda)Td2(\lambda)d\lambda>0$, and $\int Tc1(\lambda)Td1(\lambda)d\lambda \int Tc2(\lambda)Td2(\lambda)d\lambda \neq \int Tc2(\lambda)Td1(\lambda)d\lambda \int Tc1(\lambda)Td2(\lambda)d\lambda$ are satisfied.

6 Claims, 7 Drawing Sheets

IMAGING DEVICE

TECHNICAL FIELD

The present invention relates to a single-lens 3D image capturing technology for generating multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as a "multi-viewpoint image") by using a single camera have been researched and developed. Such a method is called a "single-lens image capturing method". For example, Patent Document No. 1 discloses a technique for obtaining two images with parallax at the same time using color filters. FIG. 11 schematically illustrates an image capturing system that adopts such a technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film 21. In the meantime, only red- and blue-based light rays are respectively transmitted through the two color filters 20a and 20b of the light beam confining plate 20. As a result, a magenta-based color image is produced on the photosensitive film 21 by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, a multi-viewpoint image can be produced using the two color filters.

According to the technique disclosed in Patent Document No. 1, the light rays are imaged on the photosensitive film, thereby producing multiple images with parallax there. Meanwhile, Patent Document No. 2 discloses a technique for producing images with parallax by transforming incoming light into electrical signals. FIG. 12 schematically illustrates a light beam confining plate 22 according to such a technique. Specifically according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one illustrated in FIG. 12. FIG. 13 schematically illustrates a light beam confining plate 23 as disclosed in Patent Document No. 3. According to that technique, by making the incoming light pass through R, G and B areas 23R, 23G and 23B of the light beam confining plate 23, multiple images with parallax can also be produced.

Patent Document No. 4 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. And by defining corresponding points between those images on a pixel-by-pixel basis, the magnitude of parallax can be calculated. And based on the magnitude of parallax calculated and information about the focus length of the camera, the distance from the camera to the subject can be obtained.

Patent Document No. 5 discloses a technique for obtaining information about a subject's distance based on two images that have been generated using either a diaphragm to which two color filters with mutually different aperture sizes (e.g., red and blue color filters) are attached or a diaphragm to which two color filters in two different colors are attached horizontally symmetrically with respect to the optical axis. According to such a technique, if light rays that have been transmitted through the red and blue color filters with mutually different aperture sizes are observed, the degrees of blur observed vary from one color to another. That is why the degrees of blur of the two images that are associated with the red and blue color filters vary according to the subject's distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 1 to 5 mentioned above, images with parallax can be produced by arranging RGB color filters on a light beam confining plate or a diaphragm. However, since the RGB based color filters are used, the percentage of the incoming light that can be used decreases significantly. In addition, to increase the effect of parallax, those color filters should be arranged at distant positions and should have decreased areas. In that case, however, the percentage of the incoming light that can be used further decreases.

Unlike these techniques, Patent Document No. 6 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, multi-viewpoint images can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294
Patent Document No. 4: Japanese Laid-Open Patent Publication No. 2010-38788
Patent Document No. 5: Japanese Laid-Open Patent Publication No. 2010-79298
Patent Document No. 6: Japanese Laid-Open Patent Publication No. 2003-134533

SUMMARY OF INVENTION

Technical Problem

According to any of the techniques disclosed in Patent Documents Nos. 1 to 5, multi-viewpoint images can be certainly obtained, but the quantity of the light received by the image sensor is much smaller than usual because primary color (RGB) based color filters are used. On the other hand, according to the technique disclosed in Patent Document No. 6, a normal image that uses the incoming light highly efficiently can be obtained by using a mechanism that removes a color filter from the optical path by mechanical driving. Even with that technique, however, primary color based color filters are also used to obtain multi-viewpoint images. Consequently, the multi-viewpoint images cannot be obtained with the incoming light used sufficiently efficiently. On top of that, according to such a technique, the overall size of the device increases too much and the manufacturing cost becomes too high.

In the related art, multi-viewpoint images are generated by using a photoelectrically converted signal (i.e., a pixel signal), which has been generated based on the quantity of the light that has been incident on each pixel of an image sensor, as it is, and distance information is calculated by performing corresponding point matching between those images, for example. That is why if a normal image sensor with an arrangement of color filters in primary colors is used, either the light beam confining plate or the diaphragm also needs to be provided with such color filters in primary colors. However, if the color filters provided for the light beam confining plate or the diaphragm are primary color ones, then each color filter will transmit only a light ray, whose wavelength falls within its own transmission wavelength range. For that reason, when a subject in a chromatic color is shot, the quantities of the light rays transmitted through the right and left color filters will be different from each other. For example, if an object that will mostly reflect a light ray falling within the red wavelength range has been shot, the light that has come from such an object will be transmitted through the red filter but will be hardly transmitted through the blue filter. As a result, the pixel signal of an R pixel becomes greater than that of a B pixel in the image sensor. That is to say, an image to be generated based on the pixel signal of the R pixel and an image to be generated based on the pixel signal of the B pixel may have significantly different pixel signals (or grayscales) even if those pixels are two corresponding points that represent the same position in a three-dimensional space. As a result, those two images will look quite unnatural to the viewer's eye, and if the subjects have different colors, then their grayscales at the corresponding points are also different, thus making it difficult to estimate the distance by that matching technique. Consequently, according to such a known technique that uses either a diaphragm or light beam confining plate in which multiple color filters in primary colors are arranged, if a substantially single-color light ray has been incident, no parallax information can be obtained, and therefore, such a technique is applicable to only a very narrow range, which is a problem with the related art.

The present invention provides an image capturing technique for obtaining multi-viewpoint images with the incoming light used highly efficiently without making any mechanical driving even if the light that has come from the subject is a single-color light ray.

Solution to Problem

A 3D image capture device according to the present invention includes: a light-transmitting section with m transmitting areas (where m is an integer that is equal to or greater than two), whose transmittances have mutually different wavelength dependences; a solid-state image sensor which is arranged to receive light that has been transmitted through the light-transmitting section and which includes a photosensitive cell array and a transmitting filter array that is arranged to face the photosensitive cell array, wherein the photosensitive cell array and the transmitting filter array are comprised of multiple unit elements, each of which includes n photosensitive cells (where n is an integer that is equal to or greater than m) and n transmitting filters, which are arranged to face the n photosensitive cells and whose transmittances have mutually different wavelength dependences; and an imaging section which produces an image on an imaging area of the solid-state image sensor. Supposing the wavelength is $\lambda$, functions representing the transmittances of two arbitrary ones of the m transmitting areas are $Tc1(\lambda)$ and $Tc2(\lambda)$, respectively, functions representing the transmittances of two arbitrary ones of the n transmitting filters are $Td1(\lambda)$ and $Td2(\lambda)$, respectively, and the interval of integration is the entire visible radiation wavelength range, $\int Tc1(\lambda)Td1(\lambda)d\lambda > 0$,
$\int Tc1(\lambda)Td2(\lambda)d\lambda > 0$,
$\int Tc2(\lambda)Td1(\lambda)d\lambda > 0$,
$\int Tc2(\lambda)Td2(\lambda)d\lambda > 0$ and
$\int Tc1(\lambda)Td1(\lambda)d\lambda \int Tc2(\lambda)Td2(\lambda)d\lambda$
$\neq \int Tc2(\lambda)Td1(\lambda)d\lambda \int Tc1(\lambda)Td2(\lambda)d\lambda$ are satisfied.

In one embodiment, the 3D image capture device further includes an image generating section that generates m multi-viewpoint images based on light rays that have been incident on the m transmitting areas by using photoelectrically converted signals provided by at least m out of the n photosensitive cells.

In one embodiment, the image generating section generates the m multi-viewpoint images by performing arithmetic operations using a matrix in n rows and m columns to be determined by the respective transmittances of the transmitting areas and the transmitting filters.

In one embodiment, m==2 and n==2, and the image generating section generates the multi-viewpoint images by using a matrix in two rows and two columns, whose elements are $\int Tc1(\lambda)Td1(\lambda)$, $\int Tc1(\lambda)Td2(\lambda)d\lambda$, $\int Tc2(\lambda)Td1(\lambda)d\lambda$ and $\int Tc2(\lambda)Td2(\lambda)d\lambda$.

In one embodiment, the transmittance of at least one of the m transmitting areas and the transmittance of at least one of the n transmitting filters are determined so as to have no wavelength dependence in the visible radiation wavelength range.

In one embodiment, at least one of the m transmitting areas and at least one of the n transmitting filters are transparent.

Advantageous Effects of Invention

According to the present invention, multi-viewpoint images can be obtained without making any mechanical driving even if the light that has come from the subject is a single-color light ray. In addition, according to a preferred embodiment of the present invention, multi-viewpoint images can be obtained with the light used more efficiently than known ones.

DESCRIPTION OF EMBODIMENTS

Figure 1:
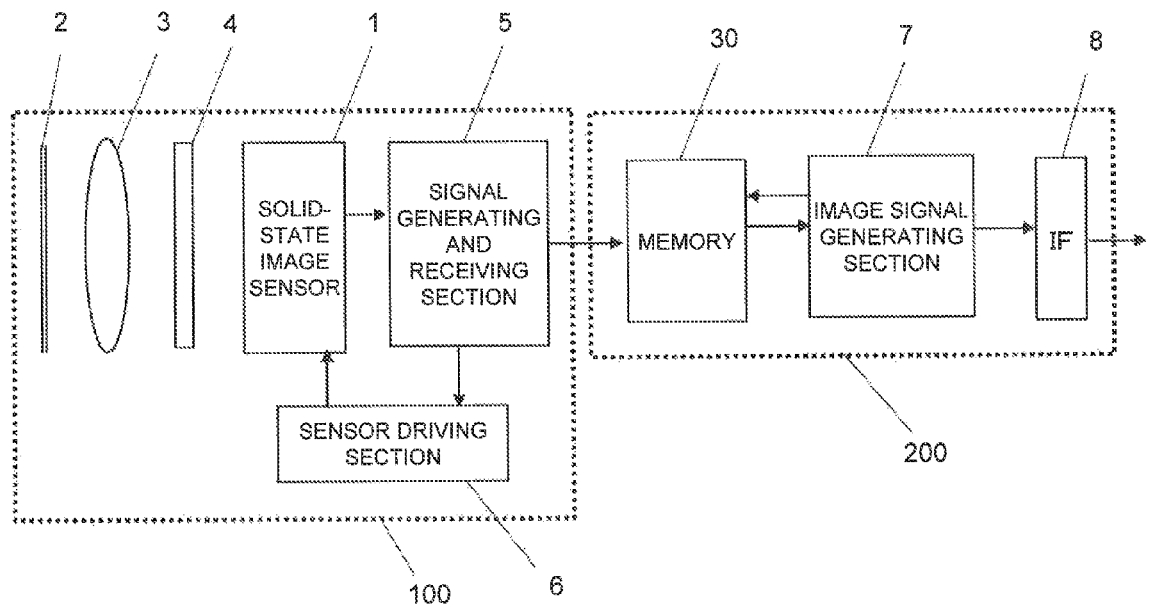
FIG. 1 A block diagram illustrating an overall configuration for a first embodiment.

Hereinafter, embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image".

Embodiment 1

FIG. 1 is a block diagram illustrating an overall configuration for an image capture device as a first embodiment of the present invention. The image capture device of this embodiment is a digital electronic camera and includes an image capturing section 100 and a signal processing section 200 that receives a signal from the image capturing section 100 and outputs a signal representing an image (i.e., an image signal).

The image capturing section 100 includes an image sensor 1 with a number of photosensitive cells (pixels) that are arranged on its imaging area, a light-transmitting plate (light-transmitting section) 2, which has two transmitting areas, whose transmittances have mutually different wavelength dependences (i.e., different spectral transmittances), an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image signal generating section 7 for generating an image signal by processing the signal supplied from the image capturing section 100, a memory 30 for storing various kinds of data for use to generate the image signal, and an interface (I/F) section 8 for sending out the image signal thus generated to an external device. The image signal generating section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, the description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
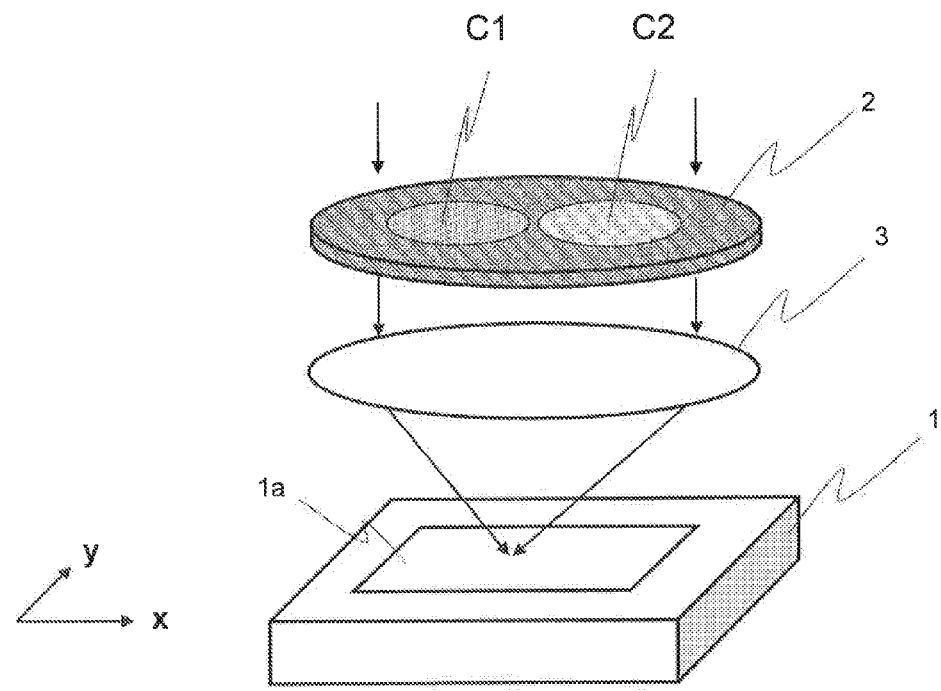
FIG. 2 A schematic representation generally illustrating the relative arrangement of a light-transmitting plate, an optical system and an image sensor according to the first embodiment.

FIG. 2 schematically illustrates the relative arrangement of the light-transmitting plate 2, the optical lens 3 and the image sensor 1 in the image capturing section 100. It should be noted that illustration of the other elements is omitted in FIG. 2. The light-transmitting plate 2 has two transmitting areas C1 and C2 that have mutually different spectral transmittances and transmits the incoming light. The optical lens 3 is a known lens and condenses the light that has been transmitted through the light-transmitting plate 2, thereby imaging the light on the imaging area 1*a* of the image sensor 1. The rest of the light-transmitting plate 2 other than the transmitting areas C1 and C2 is made of an opaque member, and this light-transmitting plate 2 is configured to prevent the incoming light from being transmitted through the area other than the transmitting areas C1 and C2. In the following description, on a plane parallel to the imaging area 1*a*, the direction that points from the area C1 toward the area C2 will be referred to herein as "x direction" and the direction that is defined perpendicularly to the x direction will be referred to herein as "y direction". It should be noted that the arrangement of the respective members shown in FIG. 2 is only an example of the present invention. And the present invention is in no way limited to that specific embodiment. Alternatively, as long as an image can be produced on the imaging area 1*a*, the lens 3 may be arranged more distant from the image sensor 1 than the light-transmitting plate 2 is. Still alternatively, the lens 3 and the light-transmitting plate 2 may also be implemented as a single optical element.

Figure 3:
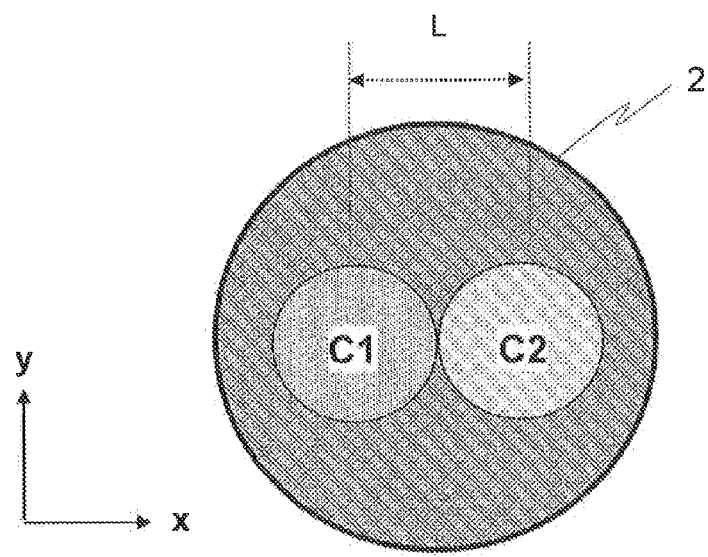
FIG. 3 A view illustrating an arrangement of transmitting areas on a light-transmitting plate according to the first embodiment.

FIG. 3 is a front view of the light-transmitting plate 2 of this embodiment. The light-transmitting plate 2, as well as the lens 3, has a circular shape in this embodiment but may also have any other shape. In each of the areas C1 and C2, arranged is a transmitting filter that transmits at least partially a light ray falling within an arbitrary wavelength range included in the wavelength range of visible radiation W. Each of those transmitting filters transmits a light ray falling within an arbitrary wavelength range included in the wavelength range of the visible radiation. However, since their spectral transmittances are different, the light transmitted will have different brightness (or luminance) values depending on whether the light has been transmitted through the area C1 or the area C2. The spectral transmittances of the respective transmitting areas will be described in detail later. As long as each transmitting filter has the function of transmitting the light at an intended transmittance, the filter may be made of any material. For example, the transmitting filters may be made of glass, plastic, cellophane or any other suitable material. Although transmitting filters with mutually different spectral transmittances are arranged in the transmitting areas C1 and C2, those areas may be made of any other member as long as the member has the intended spectral transmittance. For instance, if one of the two transmitting areas needs to be transparent, then that area may be replaced with the air. In this description, to be "transparent" means that the transmittance does not depend on the wavelength in the visible radiation wavelength range and that light is neither absorbed nor scattered.

The areas C1 and C2 are arranged with a certain gap L left in the x direction. The gap L is determined by the size of the lens 3 so that the image obtained will have appropriate parallax, and may be set to be within the range of several millimeters to several centimeters, for example. As shown in FIG. 3, the transmitting areas C1 and C2 had better be arranged horizontally symmetrically (i.e., in the x direction) with respect to the optical axis and have the same area. If such an arrangement is adopted, the quantities of the light rays to be incident on the left and right areas C1 and C2 become substantially equal to each other. It should be noted that the arrangement of the transmitting areas C1 and C2 does not have to be the one shown in FIG. 3 but may also be determined appropriately according to the intended use. For example, if information about vertical parallax (i.e., in the y direction) needs to be obtained, then the transmitting areas C1 and C2 may be arranged in the y direction. Also, if the respective transmittances of the transmitting areas C1 and C2 are significantly different from each other, then the pixel values to be observed will also be quite different. As a result, two images to be obtained will have different brightness values. That is why if there is a significant difference in transmittance between those transmitting areas C1 and C2, the planar areas of those areas C1 and C2 may be adjusted so that two images to be obtained will have close brightness values.

On the imaging area 1*a* of the image sensor 1 shown in FIG. 2, there is an array of photosensitive cells that are arranged two-dimensionally and an array of transmitting filters that are arranged to face those photosensitive cells in the array. The array of photosensitive cells and the array of transmitting filters consist of multiple unit elements. In this embodiment, each unit element includes two photosensitive cells and two associated transmitting filters that face them. Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each transmitting filter may be made of known pigment or a stack of dielectric materials and is designed so as to transmit at least a part of a light ray with an arbitrary wavelength falling within the visible radiation wavelength range.

Figure 4:
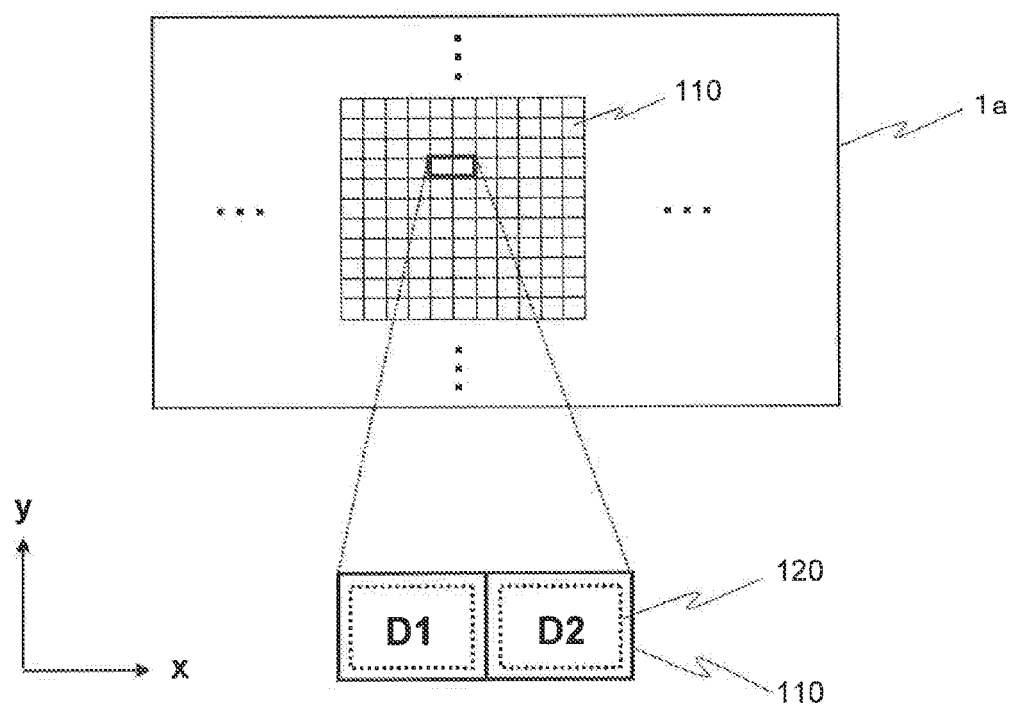
FIG. 4 A view illustrating a basic arrangement of transmitting filters in the image sensor of the first embodiment.

FIG. 4 is a top view schematically illustrating a portion of the array of transmitting filters according to this embodiment. As shown in FIG. 4, a lot of transmitting filters 110 are arranged in columns and rows on the imaging area 1*a*. As described above, each unit element includes two transmitting filters 110 that are arranged close to each other and two photosensitive cells 120 that face them. The two transmitting filters D1 and D2 that are included in each unit element both transmit a light ray with an arbitrary wavelength falling within the visible radiation wavelength range but their transmittances have mutually different wavelength dependences. It will be described later how to set the transmittances of those transmitting filters D1 and D2, as well as the transmittances of the transmitting areas C1 and C2 of the light-transmitting plate 2.

In the example illustrated in FIG. 4, two photosensitive cells are arranged horizontally (i.e., in the x direction). However, the photosensitive cells 120 may also be arranged in any other pattern. For example, the photosensitive cells may be arranged vertically (i.e., in the y direction) or obliquely. Furthermore, the number of photosensitive cells 120 included in a single unit element does not have to be two but may also be three or more. Moreover, the photosensitive cells 120 and the transmitting filters 110 do not have to be arranged in the x and y directions but may also be arranged obliquely with respect to the x and y directions.

According to such an arrangement, the light that has entered this image capture device during an exposure process passes through the light-transmitting plate 2, the lens 3, the infrared cut filter 4 and the transmitting filters 110 and then is incident on the photosensitive cells 120. Each of those photosensitive cells receives a light ray that has been transmitted through the area C1 or C2 of the light-transmitting plate 2 and then through its associated transmitting filter, and outputs a photoelectrically converted signal representing the quantity of the light received.

The photoelectrically converted signal that has been output from each photosensitive cell is sent to the signal processing section 200 by way of the signal generating and receiving section 5. In the signal processing section 200, the image signal generating section 7 generates multi-viewpoint images based on the signals supplied from the image capturing section 100.

Hereinafter, the photoelectrically converted signals supplied from those photosensitive cells will be described. Signals representing the respective intensities of light rays that have been transmitted through the areas C1 and C2 and then incident on two pixels of interest will be identified herein by Ci1 and Ci2, respectively, in a situation where the transmitting areas C1 and C2 and the transmitting filters D1 and D2 are supposed to have a transmittance of 100% with respect to any wavelength. Also, a light ray with the same intensity is supposed to be incident on each of the photosensitive cells included in a single unit element and every incoming light is supposed to be visible radiation. Furthermore, for the sake of simplicity, the wavelength dependences of the intensities of the light rays that are incident on the areas C1 and C2 are neglected. That is to say, the subject is supposed to be in an achromatic color. Also, the spectral transmittance of the lens 3 and the infrared cut filter 4 combined will be identified herein by Tw. And the spectral transmittances of the areas C1 and C2 will be identified herein by Tc1 and Tc2, respectively. In the same way, the spectral transmittances of the transmitting filters D1 and D2 at the image sensor 1 will be identified herein by Td1 and Td2, respectively.

In this case, Tw, Tc1, Tc2, Td1 and Td2 are functions that depend on the wavelength λ of the incoming light, and will be represented as Tw(λ), Tc1(λ), Tc2(λ), Td1(λ) and Td2(λ), respectively. And the signals representing the intensities of light rays that have been transmitted through the transmitting filters D1 and D2 and then received by photosensitive cells that face them are identified by d1 and d2, respectively. Furthermore, the integration operation of the spectral transmittances in the visible radiation wavelength range will be identified herein by the sign Σ. For example, an integration operation ∫Tw(λ)Tc1(λ)Td1(λ)dλ with respect to the wavelength λ will be identified herein by ΣTwTc1Td1. In this case, the integration is supposed to be performed in the entire visible radiation wavelength range. Then, d1 is proportional to the sum of Ci1ΣTwTc1Td1 and Ci2ΣTwTc2Td1. Likewise, d2 is proportional to the sum of Ci1ΣTwTc1Td2 and Ci2ΣTwTc2Td2. Supposing the constant of proportionality with respect to these relations is one, d1 and d2 can be represented by the following Equations (1) and (2), respectively:

$$d1 = Ci1 \Sigma TwTc1Td1 + Ci2 \Sigma TwTc2Td1 \quad (1)$$

$$d2 = Ci1 \Sigma TwTc1Td2 + Ci2 \Sigma TwTc2Td2 \quad (2)$$

Suppose, in Equations (1) and (2), ΣTwTc1Td1, ΣTwTc2Td1, ΣTwTc1Td2, and ΣTwTc2Td2 are identified by Mx11, Mx12, Mx21 and Mx22, respectively. Then, Equation (1) can be represented by the following Equation (3) using a matrix:

$$\begin{pmatrix} d1 \\ d2 \end{pmatrix} = \begin{pmatrix} Mx11 & Mx12 \\ Mx21 & Mx22 \end{pmatrix} \begin{pmatrix} Ci1 \\ Ci2 \end{pmatrix} \quad (3)$$

Supposing the respective elements of an inverse matrix, which is obtained by inverting the matrix consisting of the elements Mx11 through Mx22 as represented by Equation (3), are identified by iM11 through iM22, respectively, Equation (3) can be modified into the following Equation (4). That is to say, the signals Ci1 and Ci2 representing the intensities of the light rays that have been incident on the areas C1 and C2 can represented by using the photoelectrically converted signals d1 and d2:

$$\begin{pmatrix} Ci1 \\ Ci2 \end{pmatrix} = \begin{pmatrix} iMx11 & iMx12 \\ iMx21 & iMx22 \end{pmatrix} \begin{pmatrix} d1 \\ d2 \end{pmatrix} \quad (4)$$

By adopting such a configuration, the signals d1 and d2 (observed pixel values) representing the quantities of light rays that have been incident on respective pixels can be converted into the signals Ci1 and Ci2 representing the intensities of light rays to be incident on the transmitting areas C1 and C2.

The image signal generating section 7 shown in FIG. 1 carries out a signal arithmetic operation based on this Equation (4), thereby generating signals Ci1 and Ci2 on a unit element basis. These signals Ci1 and Ci2 that have been generated on a unit element basis represent two images that have been produced by the light rays that were incident on the transmitting areas C1 and C2, respectively. These two images have parallax corresponding to the distance between the two transmitting areas C1 and C2. Consequently, multi-viewpoint images can be generated by performing the arithmetic operations represented by Equation (4).

Suppose the transmitting areas C1 and C2 can transmit only a light ray with a particular wavelength as in the related art (e.g., when color filters in primary colors are arranged in C1 and C2). In that case, if a single-color light ray, whose wavelength does not fall within the transmission wavelength range of at least one of the areas C1 and C2, has come from the subject, at least one of d1 and d2 becomes equal to zero, and therefore, Ci1 and Ci2 cannot be obtained. Thus, according to this embodiment, the transmitting areas C1 and C2 and the transmitting filters D1 and D2 are configured so that Ci1 and Ci2 obtained by Equation (4) satisfy Ci1>0 and Ci2>0, respectively. As a result, even if the light that has come from the subject is a single-color light ray, parallax (i.e., signals representing the intensities of left and right light rays) can also be obtained.

Hereinafter, the condition to be satisfied by the scene and subject to be shot by the image capture device of this embodiment and the condition to be satisfied by the spectral transmittances of the transmitting areas C1 and C2 and transmitting filters D1 and D2 will be described.

<Condition 1> Condition Concerning Observed Pixel Values d1 and d2:

In this embodiment, the transmittances of the transmitting areas C1 and C2 of the light-transmitting plate 2 and the transmittances of the transmitting filters D1 and D2 of the image sensor 1 have values that are greater than zero with respect to light having an arbitrary wavelength falling within the visible radiation wavelength range. That is why except when the incoming light has a quantity of zero in the entire visible radiation wavelength range, the observed pixel value always has a positive value. For that reason, the observed pixel value d1 or d2 becomes equal to zero only when the subject's color is black or when the scene is dark.

If the observed pixel values satisfy d1=d2=0 (i.e., when either the subject or the scene to be shot is solid black), then Ci1=Ci2=0 as can be seen from Equation (4). As a result, no multi-viewpoint images can be obtained in that case. On the other hand, if d1=0 and d2≠0, then Ci1=−d2iMx12, Ci2=d2iMx22, Ci1>0 and Ci2>0 are satisfied as can also be seen from Equation (4). However, as Ci1 becomes equal to Ci2 multiplied by a constant, there is a difference in brightness but no parallax information can be obtained. The same can be said when d1≠0 and d2=0 are satisfied.

Consequently, in the scene to be shot by the image capture device of this embodiment, the observed pixel values need to satisfy both d1>0 and d2>0.

<Condition 2> Condition Concerning Transformation Matrix for Transforming Observed Pixel Values into Multi-Viewpoint Image Signals:

Next, a condition for obtaining multi-viewpoint image signals Ci1 and Ci2 based on the observed pixel values d1 and d2 using a transformation matrix (Mx11, Mx12, Mx21, Mx22), which is defined by the respective spectral transmittances of the transmitting areas C1 and C2 of the light-transmitting plate 2 and the transmitting filters D1 and D2 of the image sensor 1, will be described. The basic condition for obtaining the multi-viewpoint image signals Ci1 and Ci2 is that Equation (3) can be transformed into Equation (4). If Equation (4) is represented using variables of Equation (3), then the following Equation (5) is obtained:

$$\begin{pmatrix} Ci1 \\ Ci2 \end{pmatrix} = \frac{1}{Mx11Mx22 - Mx12Mx21} \begin{pmatrix} Mx22 & -Mx12 \\ -Mx21 & Mx11 \end{pmatrix} \begin{pmatrix} d1 \\ d2 \end{pmatrix} \quad (5)$$

To satisfy this Equation (5), the determinant needs to have a non-zero value. That is to say, the following Equation (6) needs to be satisfied.

$$\det = Mx11Mx22 - Mx12Mx21 \quad (6)$$

$$= \sum TwTc1Td1 \sum TwTc2Td2 -$$

$$\sum TwTc2Td1 \sum TwTc1Td2$$

$$\neq 0$$

<Condition 3> Condition Concerning Permissible Ranges for Incoming Light Intensity Signals Ci1 and Ci2:

The signals Ci1 and Ci2 represent the intensities of the light, and therefore, need to satisfy Ci1>0 and Ci2>0. To define a condition on which Ci1>0 and Ci2>0 are satisfied for arbitrary d1 and d2 in Equation (3), the equation is modified in the following manner. First of all, by multiplying both sides of Equation (5) by the transpose of the 2×2 matrix on the right side of Equation (5) from the left, the following Equation (7) is obtained:

$$\begin{pmatrix} Mx22 & -Mx12 \\ -Mx21 & Mx11 \end{pmatrix}^T \begin{pmatrix} Ci1 \\ Ci2 \end{pmatrix} = \frac{1}{Mx11Mx22 - Mx12Mx21} \quad (7)$$

$$\begin{pmatrix} Mx22 & -Mx12 \\ -Mx21 & Mx11 \end{pmatrix}^T \begin{pmatrix} Mx22 & -Mx12 \\ -Mx21 & Mx11 \end{pmatrix} \begin{pmatrix} d1 \\ d2 \end{pmatrix}$$

If the right side of Equation (7) is modified, the following Equation (8) is obtained:

$$\begin{pmatrix} Mx22 & -Mx12 \\ -Mx21 & Mx11 \end{pmatrix}^T \begin{pmatrix} Ci1 \\ Ci2 \end{pmatrix} = \quad (8)$$

$$\frac{1}{\det} \begin{pmatrix} Mx22Mx22 + Mx21Mx21 & -Mx12Mx22 - Mx21Mx11 \\ -Mx12Mx22 - Mx11Mx21 & Mx12Mx12 + Mx11Mx11 \end{pmatrix}$$

$$\begin{pmatrix} d1 \\ d2 \end{pmatrix}$$

The matrix on the right side of Equation (8) is a real symmetric matrix, which is identified herein by Mat as in the following Equation (9):

$$Mat = \quad (9)$$

$$\frac{1}{\det} \begin{pmatrix} Mx22Mx22 + Mx21Mx21 & -Mx12Mx22 - Mx21Mx11 \\ -Mx12Mx22 - Mx11Mx21 & Mx12Mx12 + Mx11Mx11 \end{pmatrix}$$

In this case, to make both sides of Equation (8) positive, the matrix Mat needs to be a positive definite symmetric matrix. If the quadratic form $x^T(Mat)x$ corresponding to the real symmetric matrix Mat is positive (i.e., if $x^T(Mat)x>0$ is satisfied with respect to an arbitrary real number vector x), that symmetric matrix Mat is called a "positive definite symmetric matrix". That is why by indicating a condition on which the quadratic form of the matrix Mat becomes positive, a condition on which Ci1 and Ci2 become positive with respect to arbitrary d1 and d2 can be derived.

If the symmetric matrix Mat of Equation (9) is represented in the quadratic form, then the following Inequality (10) is obtained based on the condition described above:

$$d^T \frac{1}{\det} \begin{pmatrix} Mx22Mx22 + Mx21Mx21 & -Mx12Mx22 - Mx21Mx11 \\ -Mx12Mx22 - Mx11Mx21 & Mx12Mx12 + Mx11Mx11 \end{pmatrix} \quad (10)$$

$$d > 0$$

By expanding this Inequality (10), the following Inequality (11) is obtained:

$$\frac{1}{\det}\{(Mx22Mx22 + Mx21Mx21)d1^2 - (Mx12Mx22 + Mx21Mx11) \quad (11)$$

$$d1d2 + (Mx11Mx11 + Mx12Mx12)d2^2\} > 0$$

To satisfy Inequality (11) with respect to arbitrary d1 and d2, the following Inequality (12) needs to be satisfied:

$$det^{-1}(Mx12Mx22+Mx21Mx11)<0 \quad (12)$$

Mx12, Mx22, Mx21 and Mx11 are the integrated values of the spectral transmittances that are positive values, and therefore, are always positive. That is why the condition on which $det^{-1}<0$ (i.e., det<0) is satisfied needs to be defined. In this case, since det=Mx11Mx22−Mx12Mx21, det<0 is net when the condition of the following Inequality (13) is satisfied:

$$Mx11Mx22 < Mx12Mx21 \quad (13)$$

In this case, if Mx11Mx22<Mx12Mx21 is not satisfied (i.e., if Mx11Mx22>Mx12Mx21 is satisfied) after the spectral transmittances of the respective transmitting filters have been set and after Mx11 through Mx22 have been determined, the matrix can be transformed so as to satisfy Inequality (13) by changing some rows with each other. That is to say, if det≠0 is satisfied, the matrix can be transformed to have a positive value by changing some rows of the determinant with respect to a filter with an arbitrary spectral transmittance.

Consequently, to make the signals Ci1 and Ci2 satisfy Ci1>0 and Ci2>0, det≠0 needs to be met, which is the same as the condition of Equation (6). As a result, the spectral transmittances of the transmitting areas C1 and C2 and the transmitting filters D1 and D2 of this embodiment are determined so as to satisfy det≠0.

In this case, if Equation (6) is modified using the integral sign, the following Equation (14) is obtained:

$$det = \int Tw(\lambda)Tc1(\lambda)Td1(\lambda) \int Tw(\lambda)Tc2(\lambda)Td2(\lambda) - \int Tw(\lambda) Tc2(\lambda)Td1(\lambda) \int Tw(\lambda)Tc1(\lambda)Td2(\lambda) \neq 0 \quad (14)$$

Tw(λ) is the spectral transmittance of the lens 3 and the infrared cut filter 4 combined, and therefore, can be regarded as being constant irrespective of the wavelength λ in the visible radiation wavelength range. That is why Equation (14) can be modified into the following Equation (15):

$$\int Tc1(\lambda Td1(\lambda) \int Tc2(\lambda)Td2(\lambda) \neq \int Tc2(\lambda)Td1(\lambda) \int Tc1(\lambda)Td2(\lambda) \quad (15)$$

Consequently, the transmitting filters C1, C2, C3 and C4 of this embodiment are designed to satisfy this Equation (15). As a result, the image signals Ci1 and Ci2 can be obtained by performing arithmetic operations based on Equation (4).

Alternatively, the arithmetic processing described above may also be carried out from the same point of view by using a matrix, whose elements are $\int Tc1(\lambda)Td1(\lambda)d\lambda$, $\int Tc1(\lambda)Td2(\lambda)d\lambda$, $\int Tc2(\lambda)Td1(\lambda)d\lambda$ and $\int Tc2(\lambda)Td2(\lambda)d\lambda$ from which Tw has been removed, instead of the matrix represented by Equation (3). Since Tw is just a constant, the same conclusion will be drawn in that case, too.

Figure 5:
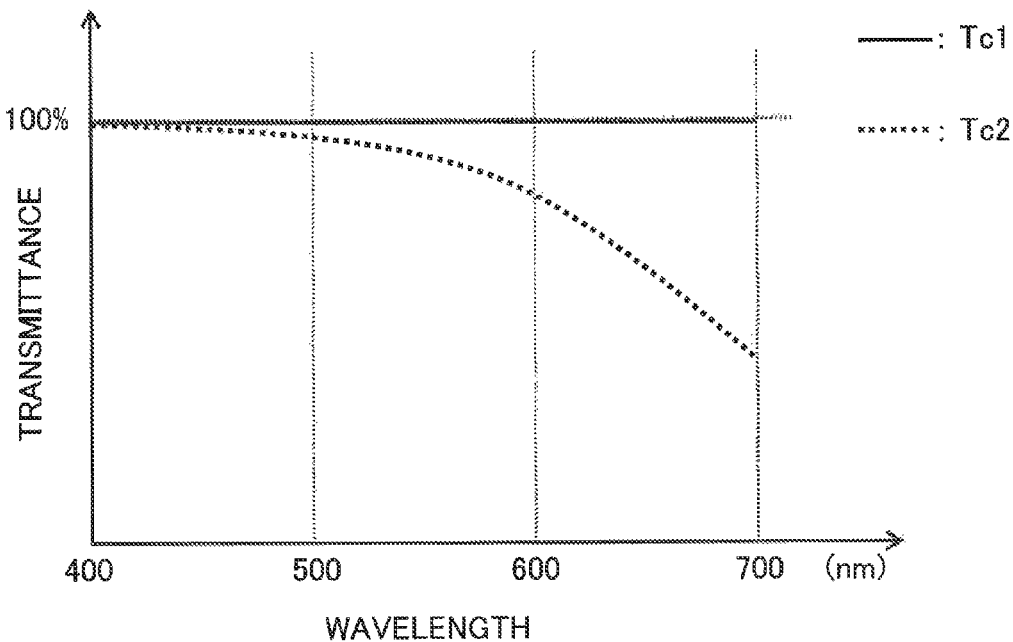
FIG. 5 A graph showing an example of the spectral transmittances of transmitting filters for the light-transmitting plate.
Figure 6:
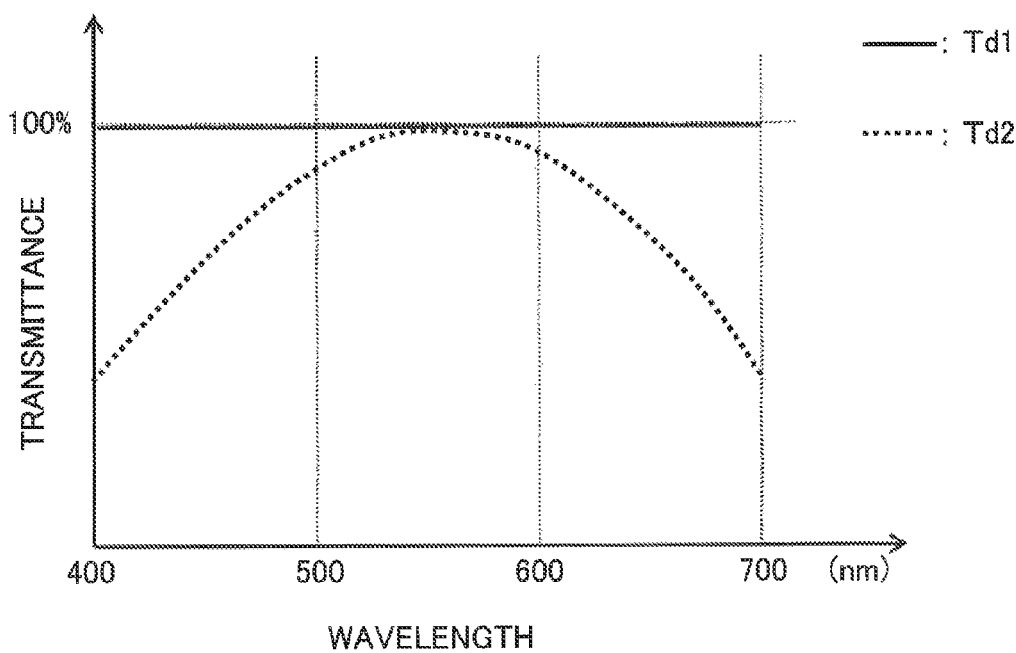
FIG. 6 A graph showing an example of the spectral transmittances of transmitting filters for the image sensor.

An example of transmitting areas C1 and C2 and transmitting filters D1 and D2, whose spectral transmittances satisfy the conditions described above, will be described briefly. FIG. 5 shows exemplary spectral transmittances of the transmitting areas C1 and C2 of the light-transmitting plate 2. In this example, the spectral transmittance Tc1 of the area C1 is represented by a waveform similar to a rectangular wave, whose spectral transmittance becomes 100% in the visible radiation wavelength range (i.e., from approximately 400 nm to approximately 700 nm). On the other hand, the spectral transmittance Tc2 of the area C2 is represented by a waveform similar to a cos curve in the visible radiation wavelength range. Meanwhile, FIG. 6 shows exemplary spectral transmittances of the transmitting filters D1 and D2 of the image sensor 1. In this example, the spectral transmittance Td1 of the transmitting filter D1 is represented by a waveform similar to a rectangular wave, while the spectral transmittance Td2 of the transmitting filter D2 is represented by a waveform similar to a sin curve. If the spectral transmittances have been set as described above, ΣTc1Td1>0, ΣTc1Td2>0, ΣTc2Td1>0 and ΣTc2Td2>0 are satisfied. Furthermore, as for Tc1 and Td1, the transmittance is always 100% at any wavelength, and therefore, light does not attenuate. As can be seen, if the light-transmitting plate 2 and the image sensor 1 are configured to have a transmitting area (or transmitting filter), whose transmittance becomes 100%, the incoming light can be used most efficiently. That is why it is beneficial to adopt such spectral transmittance and determine the other spectral transmittances based on the former spectral transmittance. In this example, Tc1 and Td1 are supposed to be 100% in the entire visible radiation wavelength range. However, Tc1 and Td1 do not have to be exactly 100%. Rather as long as the transmittances Tc1 and Td1 are 90% or more, sufficiently high performance can be achieved as well.

Figure 7:
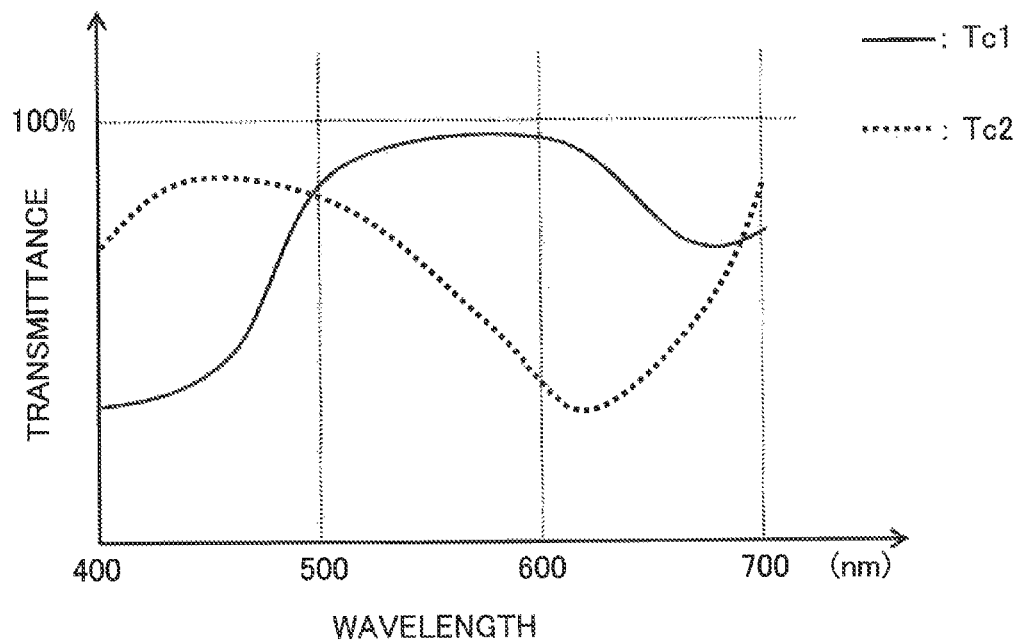
FIG. 7 A graph showing another example of the spectral transmittances of transmitting filters for the light-transmitting plate.
Figure 8:
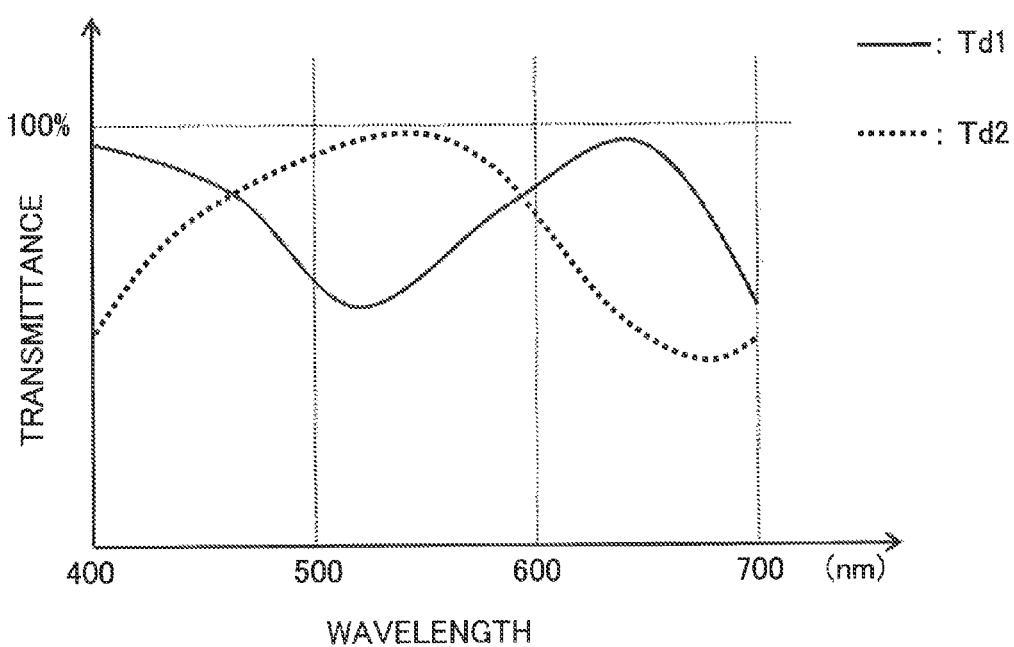
FIG. 8 A graph showing another example of the spectral transmittances of transmitting filters for the image sensor.

The filters do not have to be designed as shown in FIGS. 5 and 6 but may also be designed so as to transmit at least partially a light ray with an arbitrary wavelength falling within the visible radiation range and to make Tc1 and Tc2 different from each other and also make Td1 and Td2 different from each other. For example, the present invention is also applicable to even a situation where Tc1, Tc2, Td1 and Td2 are represented by waveforms other than the rectangular wave and the triangular function as shown in FIGS. 7 and 8.

A transmitting filter with such desired spectral characteristic may be implemented as a multilayer dielectric film, for example. By using a multilayer dielectric film, a multi-band-pass filter with multiple peaks of transmittances at wavelengths of 450 nm, 550 nm and 650 nm, respectively, can be formed. Alternatively, if R, G and B filters with high transmittances are stacked one upon the other, a transmitting filter with high transmittance can be formed although such a filter has different wavelength dependence from a transparent one.

As described above, according to this embodiment, the light-transmitting plate 2 has two transmitting areas C1 and C2 in which transmitting filters are arranged. These areas C1 and C2 both transmit a light ray with an arbitrary wavelength falling within the visible radiation wavelength range but their transmittances have mutually different wavelength dependences. Also, the photosensitive cell array and transmitting filter array of the image sensor 1 are comprised of multiple unit elements, each of which includes two pixels and two transmitting filters D1 and D2 that are arranged to face them. These transmitting filters D1 and D2 both transmit a light ray with an arbitrary wavelength falling within the visible radiation wavelength range but their transmittances have mutually different wavelength dependences. Furthermore, the transmittances of the transmitting areas C1 and C2 and the transmitting filters D1 and D2 are determined so that the image signal generating section 7 can calculate the image signals Ci1 and Ci2 by performing the arithmetic operations based on Equation (4) and satisfies the determinant det≠0. By adopting such a configuration, even if the incoming light is a single-color ray, multi-viewpoint images can also be generated.

The image capture device of the embodiment described above generates an image signal by performing signal arithmetic operations on a photoelectrically converted signal that has been obtained by capturing an image. However, such processing of generating an image signal by performing signal arithmetic operations may also be carried out by another device that is provided independently of that image capture device. For example, even if a signal that has been obtained by an image capture device including the image capturing section 100 of this embodiment is loaded into another device to get a program defining the signal arithmetic processing described above executed by that another device, the effects of the embodiment described above can also be achieved.

Embodiment 2

Hereinafter, a second embodiment of the present invention will be described.

In the image capture device of the first embodiment described above, the light-transmitting plate 2 has two transmitting filters, whose transmittances have mutually different wavelength dependences, so does each unit element of the image sensor 1. However, the present invention is in no way limited to that specific preferred embodiment. The light-transmitting plate 2 and each unit element of the image sensor 1 may each have three or more transmitting filters or may have mutually different numbers of transmitting filters. Hereinafter, a generalized one of the configuration of the first embodiment, in which m (where m is an integer that is equal or greater than two) transmitting filters are arranged in the light-transmitting plate 2 and in which n (where n is an integer that is equal to or greater than m) transmitting filters are provided for each unit element of the image sensor 1, will be described. The image capture device of this embodiment is quite the same as the first embodiment described above except the configurations of the light-transmitting plate 2 and the image sensor 1 and the processing performed by the image signal generating section 7. The following description of this second embodiment will be focused on those differences from the first embodiment and their common features will not be described all over again to avoid redundancies.

Figure 9:
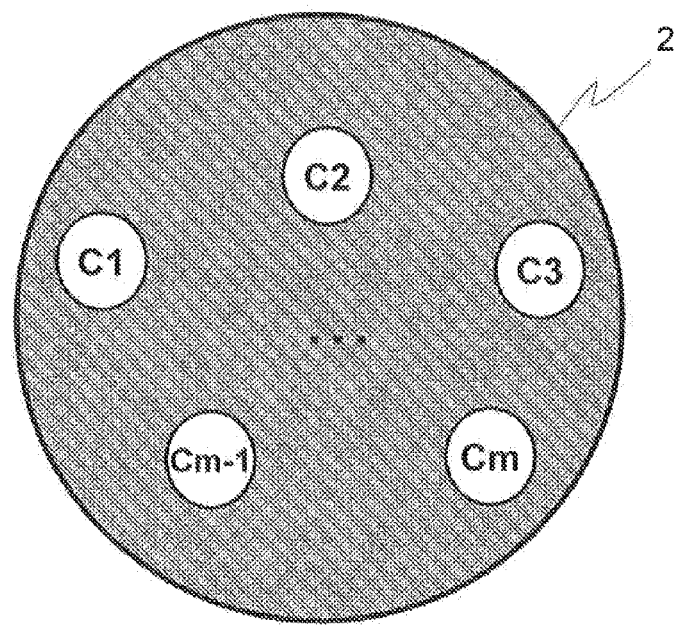
FIG. 9 A view illustrating an example of a light-transmitting plate with m transmitting areas.

FIG. 9 schematically illustrates an exemplary configuration for the light-transmitting plate 2 of this embodiment. The light-transmitting plate 2 of this embodiment has m transmitting areas C1, C2, ... and Cm, in each of which a transmitting filter is arranged. These m transmitting areas C1 through Cm are designed so as to transmit a light ray with an arbitrary wavelength falling within the visible radiation wavelength range and their transmittances have mutually different wavelength dependences. The rest of the light-transmitting plate 2 other than the m transmitting filters is an opaque area that does not transmit light. In FIG. 9, the all of those transmitting areas are drawn as circular ones with the same planar area. However, the shape and size of the respective transmitting areas do not have to be the illustrated ones. The arrangement of the respective transmitting areas does not have to be the illustrated one, either, but any other arrangement may be adopted as well. Likewise, the light-transmitting plate 2 does not have to have a circular shape, either. Furthermore, although an opaque area is provided according to this embodiment, the opaque area may also be made of a light-transmitting member and treated as a transmitting area, too.

Figure 10:
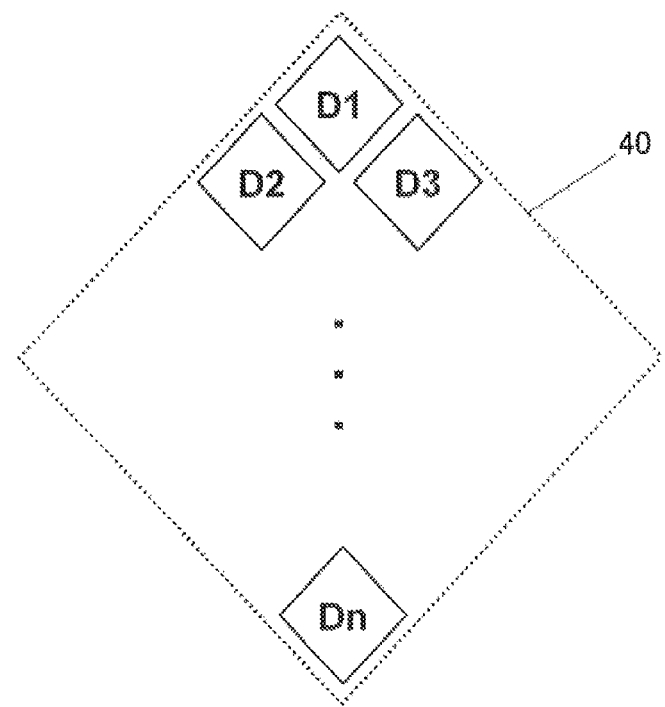
FIG. 10 A view illustrating an exemplary arrangement of n color filters in each unit element of the image sensor.
Figure 11:
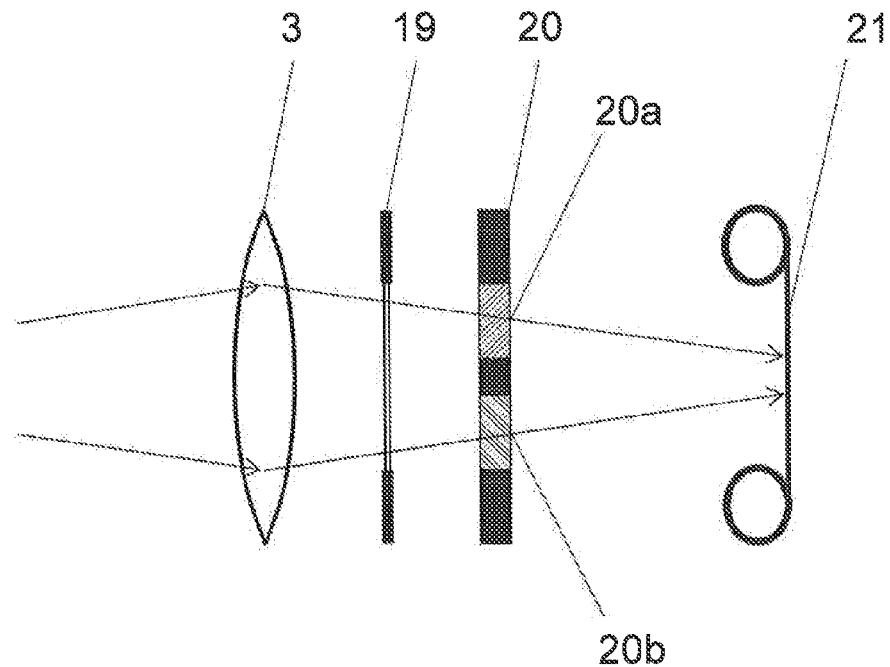
FIG. 11 A view illustrating the arrangement of an image capturing system according to Patent Document No. 1.
Figure 12:
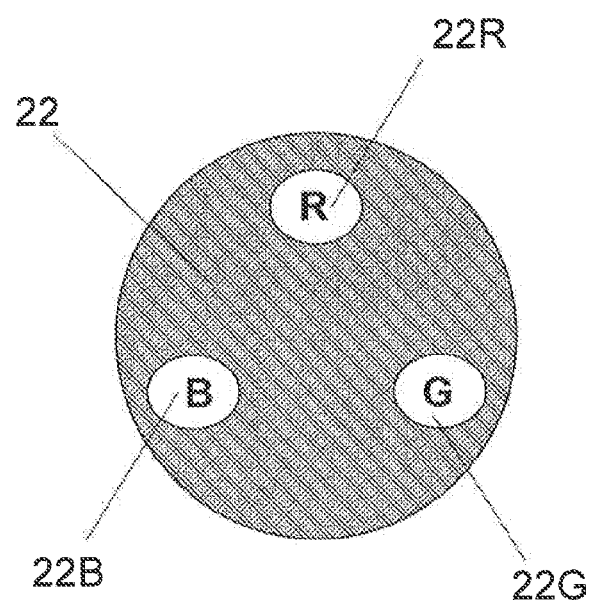
FIG. 12 A view illustrating the appearance of a light beam confining plate according to Patent Document No. 2.
Figure 13:
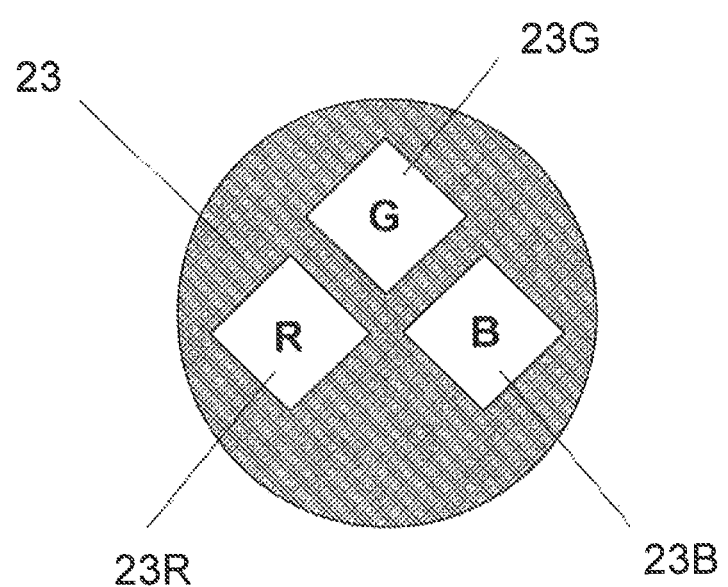
FIG. 13 A view illustrating the appearance of a light beam confining plate according to Patent Document No. 3.

FIG. 10 schematically illustrates an exemplary arrangement of n transmitting filters that are included in each unit element 40 of the image sensor 1 of this embodiment. Each unit element 40 of the image sensor 1 includes n photosensitive cells and n transmitting filters that face them. These n transmitting filters D1, D2, ... and Dn are designed so as to transmit a light ray with an arbitrary wavelength falling within the visible radiation wavelength range and their transmittances have mutually different wavelength dependences. It should be noted that the arrangement shown in FIG. 10 is just an example and pixels may also be arranged in any other pattern within each unit element 40.

Suppose, in the configuration described above, the pixel signals output from the transmitting filters D1, D2, ... and Dn of the image sensor 1 are identified by d1, d2, ... and dn, respectively, and signals representing the intensities of light rays that are incident on the respective photosensitive cells from the transmitting areas C1, C2, ... and Cm in a situation where the transmittances of the transmitting areas C1 through Cm and the transmitting filters D1 through Dn are supposed to be 100% are identified by Ci1, Ci2, ... and Cim. In that case, the relation between the pixel signals d1, d2, ... and dn and the image signals Ci1, Ci2, ... and Cim is represented by the following Equation (16):

$$\begin{pmatrix} d1 \\ d2 \\ \vdots \\ dn \end{pmatrix} = \begin{pmatrix} Mx11 & Mx12 & \ldots & Mx1m \\ Mx21 & Mx22 & \ldots & Mx2m \\ \vdots & \vdots & \ddots & \vdots \\ Mxn1 & Mxn2 & \ldots & Mxnm \end{pmatrix} \begin{pmatrix} Ci1 \\ Ci2 \\ \vdots \\ Cim \end{pmatrix} \quad (16)$$

In Equation (16), if each element is positive and if the determinant det≠0, then the intensities of light rays that have come through the respective transmitting filters of the light-transmitting plate 2 can be obtained. Since the respective transmitting areas of the light-transmitting plate 2 and the respective transmitting filters of the image sensor 1 are each designed so as to transmit a light ray with an arbitrary wavelength falling within the visible radiation range as in the first embodiment described above, the image signals Ci1 through Cin representing the light rays that have been incident on the respective transmitting areas of the light-transmitting plate 2 can be calculated based on the pixel signals d1 through dn.

Hereinafter, it will be described what is a condition for obtaining an inverse matrix that needs to be used to perform arithmetic operations to generate the image signals Ci1 through Cin. First of all, if m>n, there are only n independent equations, and therefore, Ci1 through Cim cannot be obtained. That is to say, since the rank of the matrix is smaller than m, the solution of Equation (16) cannot be obtained. On the other hand, if n≥m, the solution can be obtained when there are m or more independent equations. That is why by choosing n' (where m≤n'≤n) independent equations, which makes the matrix rank m, the solution can be obtained by the minimum square method.

Even in a multi-dimensional matrix such as the matrix represented by Equation (16), if the determinant det≠0, the rank becomes m. That is why it can be determined by the value of the determinant whether or not the solution can be calculated. There are other methods for calculating the rank. For example, some of eigenvalues that have been obtained by eigenvalue analysis (such as principal component analysis, singular value decomposition or QR decomposition) have non-zero values, and the number of such eigenvalues indicates the rank. That is why the condition that the number of non-zero ones of the eigenvalues obtained by performing an eigenvalue analysis on a matrix is m is equivalent to the condition (det≠0) described above. It should be noted that if n>m, then the matrix of Equation (16) (which will be referred to herein as "A") and the transpose ($A^t$) of A have the same eigenvalue. That is why A and At may be multiplied together to obtain a square matrix and then the eigenvalue analysis may be carried out. In this manner, the rank can be calculated.

Suppose the wavelength is identified by λ, the transmittances of two arbitrary ones of the m transmitting filters of the light-transmitting plate 2 are identified by Tc1(λ) and Tc2(λ), and the transmittances of two arbitrary ones of the n transmitting filters included in each unit element of the image sensor 1 are identified by Td1(λ) and Td2(λ), respectively. In that case, the respective transmitting filters of this embodiment are designed so as to satisfy ∫Tc1(λ)Td1(λ)dλ>0, ∫Tc1(λ)Td2(λ)dλ>0, ∫Tc2(λ)Td1(λ)dλ>0 and ∫Tc2(λ)Td2(λ)

$d\lambda>0$. Furthermore, the respective transmitting filters are designed so as to satisfy the following Equation (17):

$$\int Tc1(\lambda)Td1(\lambda)d\lambda \int Tc2(\lambda)Td2(\lambda)d\lambda \neq \int Tc2(\lambda)Td1(\lambda)d\lambda \int Tc1(\lambda)Td2(\lambda)d\lambda \quad (17)$$

It should be noted that the interval of integration is the entire visible radiation wavelength range. By satisfying these conditions, the image signals Ci1 through Cim can be obtained by Equation (14).

The image capture device of this embodiment does not have to generate all of those signals Ci1 through Cim but may be configured to generate at least two of those signals. Even when such a configuration is adopted, at least two image data with parallax can also be obtained. Optionally, m multi-viewpoint images can be generated by selectively using only m pixel signals, not all of those n pixel signals, to make the matrix rank m.

In this embodiment, at least one of the m transmitting areas and at least one of the n transmitting filters may be filters with no wavelength dependence. Particularly, in order to use the incoming light more efficiently, those filters had better be transparent.

Finally, it will be described with how much stability the image capture device of each of the embodiments described above can derive the solution in calculating the intensities of multiple incident light rays based on the observed pixel values. The following description is supposed to be applied to the configuration of the first embodiment. However, the same statement is also applicable to even the generalized configuration that has been described as the second embodiment. First of all, Equation (5) is formulated again with the noise taken into account. In this case, the magnitudes of noise applied to the observed pixel values d1 and d2 are identified by $\Delta d1$ and $\Delta d2$. Examples of such noise include the thermal noise of an image, shot noise on the transmission line or at the image sensor, and error of spectral transmittance measured. In that case, Equation (5) can be modified into the following Equations (18) and (19):

$$Ci1 = det^{-1}[Mx22(d1+\Delta d1) - Mx12(d2+\Delta d2)] \quad (18)$$

$$Ci2 = det^{-1}[Mx21(d1+\Delta d1) - Mx11(d2+\Delta d2)] \quad (19)$$

where det is a determinant and det=Mx11Mx22−Mx12Mx21. If terms of Equation (18) that are related to the original signals d1 and d2 are moved to the left side, the following Equation (20) is obtained:

$$Ci1 - det^{-1}(Mx22 d1 - Mx12 d2) = det^{-1}(Mx22\Delta d1 - Mx12\Delta d2) \quad (20)$$

This Equation (20) represents the noise, and should be equal to zero if there was no noise. The magnitude of noise on the right side is proportional to a signal quantity if the noise has been caused by the image sensor 1, but becomes a constant offset if the noise has been caused due to the error of the spectral transmittance measured. It depends on the shooting environment which of these two magnitudes of noise is the greater than the other, and therefore, simply (Mx22 $\Delta d1$ − Mx12 $\Delta d2$)=N is supposed to be satisfied in this example. Then, the following Equation (21) is obtained:

$$Ci1 - det^{-1}(Mx22 d1 - Mx12 d2) = det^{-1}N \quad (21)$$

As can be seen from Equation (21), the error is inversely proportional to the determinant. That is to say, the smaller the absolute value of the determinant, the more significant the influence of the noise. The greater the absolute value of the determinant, the less significant the influence of the error. In view of these considerations, it is difficult to measure the magnitude of noise. Nevertheless, by setting the spectral transmittances of the respective transmitting filters to make |det|=|Mx11Mx22−Mx12Mx21| as large as possible, a robust image capture device with high noise resistance can be constructed. For example, it turned out empirically that when an image is shot under a fluorescent lamp with the sensitivity of the camera set to be ISO100, the solution can be obtained with good stability if the absolute value of the determinant is equal to or greater than 0.1. In an image capture device that is expected to be often used under such a condition, Tc1, Tc2, Td1 and Td2 may be set so that the absolute value of the determinant becomes equal to or greater than 0.1. Meanwhile, in an image capture device that is expected to be used in an even noisier environment, Tc1, Tc2, Td1 and Td2 may be set so as to make the absolute value of the determinant even greater.

In this manner, the spectral transmittances of the respective transmitting filters had better be set so that the absolute value of the determinant becomes equal to or greater than a predetermined threshold value in a shooting environment in which the noise increases or decreases according to the brightness of the scene to be shot or a camera setting such as the ISO sensitivity. That is why to allow the user to choose the best set of spectral transmittances, multiple different kinds of light-transmitting plates with mutually different transmission properties may be provided for the image capture device. In that case, if the image capture device is configured so that one of the multiple light-transmitting plates is chosen either automatically or manually according to the magnitude of noise expected from the shooting environment, the absolute value of the determinant can always be greater than the predetermined threshold value.

INDUSTRIAL APPLICABILITY

A 3D image capture device according to the present invention can be used effectively in any camera that ever uses a solid-state image sensor. Examples of those cameras include consumer electronic cameras such as digital still cameras and digital camcorders and solid-state surveillance cameras for industrial use.

REFERENCE SIGNS LIST 1 solid-state image sensor
1a imaging area of solid-state image sensor
2 light-transmitting plate
3 optical lens
3a optical element with combined functions of light-transmitting plate and optical lens
4 infrared cut filter
5 signal generating and receiving section
6 sensor driving section
7 image signal generating section
8 interface section
19 lens diaphragm
20, 22, 23 light beam confining plate
20a color filter that transmits red based ray
20b color filter that transmits blue based ray
21 photosensitive film
22R, 23R R ray transmitting area of light beam confining plate
22G, 23G G ray transmitting area of light beam confining plate
22B, 23B B ray transmitting area of light beam confining plate
30 memory
40 unit element 100 image capturing section
110 transmitting filter
120 photosensitive cell
200 signal processing section

The invention claimed is:

1. A 3D image capture device comprising:
   a light-transmitting section with m transmitting areas (where m is an integer that is equal to or greater than two)—whose transmittances have mutually different wavelength dependences;
   a solid-state image sensor which is arranged to receive light that has been transmitted through the light-transmitting section and which includes a photosensitive cell array and a transmitting filter array that is arranged to face the photosensitive cell array, wherein the photosensitive cell array and the transmitting filter array are comprised of multiple unit elements, each of which includes n photosensitive cells (where n is an integer that is equal to or greater than m) and n transmitting filters which are arranged to face the n photosensitive cells and whose transmittances have mutually different wavelength dependences; and
   an imaging section which produces an image on an imaging area of the solid-state image sensor,
   wherein supposing the wavelength is $\lambda$, functions representing the transmittances of two arbitrary ones of the m transmitting areas are $Tc1(\lambda)$ and $Tc2(\lambda)$, respectively, functions representing the transmittances of two arbitrary ones of the n transmitting filters are $Td1(\lambda)$ and $Td2(\lambda)$, respectively, and the interval of integration is the entire visible radiation wavelength range,
   $\int Tc1(\lambda)Td1(\lambda)d\lambda > 0$,
   $\int Tc1(\lambda)Td2(\lambda)d\lambda > 0$,
   $\int Tc2(\lambda)Td1(\lambda)d\lambda > 0$,
   $\int Tc2(\lambda)Td2(\lambda)d\lambda > 0$ and
   $\int Tc1(\lambda)Td1(\lambda)d\lambda \int Tc2(\lambda)Td2(\lambda)d\lambda$
   $\neq \int Tc2(\lambda)Td1(\lambda)d\lambda \int Tc1(\lambda)Td2(\lambda)d\lambda$
   are satisfied.

2. The 3D image capture device of claim 1, further comprising an image generating section that generates m multi-viewpoint images based on light rays that have been incident on the m transmitting areas by using photoelectrically converted signals provided by at least m out of the n photosensitive cells.

3. The 3D image capture device of claim 2, wherein the image generating section generates the m multi-viewpoint images by performing arithmetic operations using a matrix in n rows and m columns to be determined by the respective transmittances of the transmitting areas and the transmitting filters.

4. The 3D image capture device of claim 2, wherein m=2 and n=2, and
   wherein the image generating section generates the multi-viewpoint images by using a matrix in two rows and two columns, whose elements are $\int Tc1(\lambda)Td1(\lambda)$, $\int Tc1(\lambda)Td2(\lambda)d\lambda$, $\int Tc2(\lambda)Td1(\lambda)d\lambda$ and $\int Tc2(\lambda)Td2(\lambda)d\lambda$.

5. The 3D image capture device of claim 1, wherein the transmittance of at least one of the m transmitting areas and the transmittance of at least one of the n transmitting filters are determined so as to have no wavelength dependence in the visible radiation wavelength range.

6. The 3D image capture device of claim 5, wherein at least one of the m transmitting areas and at least one of the n transmitting filters are transparent.

* * * * *